United States Patent [19]

Nun et al.

[11] Patent Number: 5,693,709
[45] Date of Patent: Dec. 2, 1997

[54] POLYOXYMETHYLENE WITH IMPROVED ACID STABILITY, PROCESS FOR PRODUCTION AND USE THEREOF

[75] Inventors: Edwin Nun, Brachttal; Stephanie Schauhoff, Frankfurt; Detlef Arnoldi, Weisenheim am Berg, all of Germany

[73] Assignee: Degussa Aktiengesellschaft, Frankfurt am Main, Germany

[21] Appl. No.: 701,800

[22] Filed: Aug. 26, 1996

Related U.S. Application Data

[60] Division of Ser. No. 292,025, Aug. 18, 1994, abandoned, which is a continuation-in-part of Ser. No. 137,737, Oct. 19, 1993, abandoned.

[30] Foreign Application Priority Data

Oct. 24, 1992 [DE] Germany .................. 42 35 958.9

[51] Int. Cl.$^6$ ........................................... C08K 5/05
[52] U.S. Cl. ................. 524/593; 524/394; 524/388; 525/395; 525/399; 525/405; 525/454; 525/455; 525/456
[58] Field of Search ...................... 525/131, 154, 525/395, 399, 453, 454, 455, 456, 405; 524/593, 388, 394

[56] References Cited

U.S. PATENT DOCUMENTS 5,318,813   6/1994   Flexman, Jr. .................... 428/36.9

*Primary Examiner*—H. Thi Le
*Attorney, Agent, or Firm*—Cushman Darby & Cushman IP Group of Pillsbury Madison & Sutro LLP

[57] ABSTRACT

Polyoxymethylene with improved acid stability, process for production and use thereof. By adding 0.01 to 5 parts of an alkali metal salt of a polybasic acid, for example oxalic acid, citric acid and/or 0.01 to 5 parts of a polyalkylene glycol, for example polyethylene glycol and/or 0.1 to 100 parts of a thermoplastic polyurethane, each related to 100 parts of a polyoxymethylene, this polymer is stabilized against attack by acids, wherein in particular the combination of an alkali metal salt, in particular an oxalate, with small proportions of a thermoplastic polyurethane is advantageous. The proportion of thermoplastic polyurethane may be reduced when the thermoplastic polyurethane has a Shore A hardness of 70 to 96. The weight loss of a stabilized POM under the action of acid may be less than 3% of that of an unstabilized POM. The products are useful when exposed to acidic agents such as irrigation systems, dishwashers, sanitary installations.

8 Claims, No Drawings

POLYOXYMETHYLENE WITH IMPROVED ACID STABILITY, PROCESS FOR PRODUCTION AND USE THEREOF

This is a division of application Ser. No. 08/292,025, filed Aug. 18, 1994, now abandoned, which is a CIP of Ser. No. 08/137,737 filed Oct. 19, 1993, now abandoned.

The present invention relates to polyoxymethylene with improved acid resistance, to a process for the production of polyoxymethylene with improved acid resistance and to the use of polyoxymethylene in contact with acidic media.

BACKGROUND OF THE INVENTION

Polyoxymethylene (polyacetal—POM) is an extraordinary material from which the most varied articles may be produced, in particular by injection molding. An advantageous feature is, in particular, its chemical resistance against many organic solvents and also bases. Since the introduction of polyacetals onto the market, attempts have been made to reduce the acid lability arising from their chemical structure. Unless protective measures are taken, the repeating acetal structure in the polymer chain has unstable semi-acetal terminal groups from which polymer degradation proceeds. In order to stabilize the polymer, its terminal groups may be protected by esterification or etherification, as described in H. Cherdron, L. Höhr, W. Kern, Makromol. Chem., 52, 48 et seq. (1962). Another method is to incorporate comonomers which form a stable terminal group on degradation of the polymer chain. This makes polyoxymethylene (POM) fit for everyday use, but the acid lability remains, since (c.f. V. V. Pchelintsev, A. Yu. Sokolov, G. E. Zaikov, Polym. Degradation and Stability, 21(4), 285 (1988)) acid catalyzed hydrolytic decomposition of POM may take place at any location on the polymer such that stabilized terminal groups or comonomer units do not provide sufficeint protection.

It is known from German patemt DE 11 93 240 that high proportions of a urethane scavenge the formaldehyde arising from acidolysis. An example of this is a molded article with 40% POM. In this way, the odor problems or hazard to health caused by liberated formaldehyde are reduced, but the POM is still degraded. Moreover, a product with 40% POM/60% thermoplastic polyurethane (TPU) no longer has a POM matrix so that the advantageous properties of POM (e.g. stiffness) are lost.

German patent DE 12 35 585 describes the acylation of POM with carbodiimide. This considerably reduces acidolytic degradation of the polymers by free acetic acid. The carbodiimide is, in particular, intended to provide stabilization for the transient acid conditions during esterification. Investigations have, however, shown that the products produced in this manner are also unsuitable for use under acidic conditions.

Furthermore, it is known, for example from German patent DE 25, 40 207 (U.S. Pat. Nos. 4,139,575 and 4,230, 606), to add basic substances, such as for example salts, to the POM to provide protection from the acidic conditions arising during production and processing. The basic substances act to neutralize acidic components in the polymer and so only those salts whose acidic portion does not itself attack the POM are suitable. Thus, for example, a small quantity of sodium carbonate may be added to a polyoxymethylene. The products so obtained are also unsuitable for use under acidic conditions.

POM/TPU molding compounds are known from published German Patent Application DE-OS 37 03 232 in which the polyoxymethylene contains 5.3 to 150 parts of a thermoplastic polyurethane and optionally 0.1 to 5 parts, related to the total quantity of POM+TPU, of alkaline earth metal salts of aliphatic mono- to tribasic carboxylic acids with 2–20 carbon atoms, preferably such aliphatic carboxylic acids containing hydroxyl groups.

According to DE-OS 37 03 232, the TPU is produced via an intermediate by mixing the POM with the structural components required for the TPU and then allowing them to react.

At the stated high TPU contents, the molding compound loses the stiffness of POM, while the addition of alkaline earth metal salts of polybasic carboxylic acids merely provides heat stabilization. The molding compound remains acid labile.

Reske, et al. U.S. Pat. No. 4,5517,319 discloses polyoxymethylene/polyurethane mixtures (POM-TPU mixtures) containing:

30–97% by weight POM
2.5–60% by weight TPU and
1–50% by weight of filler.

Suitable TPU's according to Reskeare those having a Shore hardness A of not higher than 90, preferably between 50 and 85, more preferably between 65 and 80. The lowest TPU content according to this patent of 2.5% by weight is actually higher when calculated on a basis of the POM, since the 2.5% by weight is calcualated on the basis of a mixture which contains 1 to 50% by weight of filler.

SUMMARY OF THE INVENTION

The object of the present invention is to provide a polyoxymethylene which has acid stability and a production process for making such a polyoxymethylene. A further object of the invention is to provide such a polyoxymethylene which, as far as possible, retains its original physical properties, such as for example stiffness, toughness, color.

These and other objects are achieved by means of a polyoxymethylene composition which has the following composition:

A at least one polyoxymethylene,

B 0.01–5 parts, related to 100 parts of A, of at least one alkali metal salt of a polybasic acid selected from the group consisting of oxalic acid, maleic acid, fumaric acid and the sodium and potassium salts of citric acid, and/or C 0.01–5 parts, related to 100 parts of A, of a polyethylene glycol with a molecular weight of ≦5000 and/or a polypropylene glycol and/or a polybutylene glycol, and/or D 0.1 to less than 2.6 parts, preferably less than 2.5 parts and more preferably less than 2 parts, related to 100 parts of A, of a thermoplastic polyurethane (TPU) with a Shore A hardness of 70 to 96.

It has been established according to the invention that various substances are suitable for reducing the acid lability of POM. It has proved particularly favorable to add mixtures of various substances, wherein it is possible to achieve an increase in acid stability beyond that achieved by the individual components. It has also been found that some substances which have previously been used in POM as acid scavengers actually even have an adverse effect on the acid resistance of the finished product and may lead to considerable discoloration. Thus, for example, carbodiimides and also sodium carbonate are unsuitable for the purposes of the present invention.

Salts of polybasic carboxylic acids which contain one or more nitrogen atoms or are sparingly soluble have also proved somewhat unsuitable. Such compounds, for example ethylenediaminetetracetic acid disodium salt or sodium glutamate lead to strong discoloration or, for example calcium oxalate, have only slight acid stabilizing properties. Nonetheless, such compounds, for example EDTA salts, when for example mixed with other acid stabilizing substances, such as for example thermoplastic polyurethane (TPU) and/or soluble oxalates, may further promote acid stabilization.

It has been found for TPU that the acid stabilizing action decreases with the Shore hardness of the TPU. In particular, TPU with Shore A hardness are particularly advantageous, wherein the range 80–96, in particular 85 to 87, is particularly suitable. Very high levels of stabilization may be achieved by means of this TPU in combination with a soluble oxalate, for example sodium oxalate, and optionally further acid stabilizers. Using this combination, levels of stabilization in excess of 80%, sometimes even in excess of 90%, may be achieved. Relatively small quantities of the additives (for example TPU 0.5 to <2.6%, in particular 1–<2.6%, sodium oxalate 0.05 to 0.5%) produce the best results. Due to the small quantities of the stabilizing components used, it is possible to obtain an acid-stabilized POM which has mechanical properties which are only slightly different from those of unstabilized POM.

According to the invention, stabilization of the POM is determined as follows:

Crude polyoxymethylene is extruded on a ZSK 28 (twin screw extruder) under conventional conditions with additives. The strands leaving the extruder are cooled by being passed through cold water and are then pelletized. The dried pellets are then compression molded at 190° C. into sheets of dimensions 15.8 cm×15.8 cm×0.2 cm, from which test pieces of dimensions 7.8 cm×1.0 cm×0.2 cm are sawed. A hole is drilled through the top of the test pieces, which are deburred (i.e., rough spots are smoothed), exactly remeasured and weighed.

Test 1

Five test pieces of each sheet are immersed to a depth of 5 cm in 2 wt. % phosphoric acid, lifted out slowly and any acid remaining on the sheet allowed to drip off. The last acid droplets remaining on the bottom of the test pieces are wiped off with cellulose wadding. The test pieces are carefully threaded onto a wire and suspended without being in contact with each other for 24 hours at relative atmospheric humidity of between 20 and 30%. Atmospheric humidity is adjusted by means of silica gel which is changed daily, so achieving atmospheric humidity of approx. 20%, which rises to a maximum of 30% within 24 hours. The traces of acid remaining on the test pieces cause corrosion (cratering on the test pieces), the extent of which is determined by weighing. The test pieces are then re-exposed to phosphoric acid. This procedure is repeated until the test piece (at least those made from unstabilized POM) exhibit clear damage (loss 5 mg/cm$^2$). Excessive damage should be avoided since this alters the geometry of the test piece in such a way that it complicates the determination of the loss in mg/cm$^2$. The period of 24 hours was selected because, under the stated conditions (room temperature), no further damage occurs after this time. This means that the test piece may optionally remain under the stated conditions for a longer period before being reimmersed in the phosphoric acid. This also means that the test pieces do not have to be treated for example at weekends. In the present case, the test pieces were not immersed in the phosphoric acid on the 5th and 6th days.

Test 2

Test pieces prepared as in test 1 are stored in 10 wt. % phosphoric acid at 80° C. in such a way that the test pieces are completely covered with acid. After 24 hours the test pieces are removed, dried with a warm air blower and the weight loss determined. The procedure is repeated until the damage stated in test 1 has occurred.

The average loss of mass in % (mg/cm$^2$ of immersed surface) is determined in relation to the average loss of mass of the standard polyoxymethylene.

The polyoxymethylene blends with improved acid resistance obtained according to the invention are particularly suitable for applications in which the products are at least temporarily exposed to acidic agents, in particular for irrigation system components or complete systems for applying fertilizers, dispensing containers of any kind, for example in dishwashers (decalcifying agents are acids), products for storing or distributing chlorinated or fluorinated water, components for sanitary installations.

The polyoxymethylenes with improved acid stability contain:

A at least one polyoxymethylene,

B 0.01–5 parts, in particular 0.1–2 parts, related to 100 parts of A, of at least one alkali metal salt of a polybasic acid selected from the group consisting of oxalic acid, maleic acid, fumaric acid and the sodium and potassium salts of citric acid, and/or C 0.01–5 parts, in particular 0.1–2 parts, related to 100 parts of A, of a polyethylene glycol with a molecular weight of ≦5000 and/or a polypropylene glycol and/or a polybutylene glycol, and/or D 0.1—less than 2.6 parts, preferably less than 2.5 parts and more preferably less than 2 parts, related to 100 parts of A, of a thermoplastic polyurethane (TPU) with a Shore A hardness of 70 to 96.

Advantageously, on acid treatment, these polyoxymethylene blends have a loss of mass per unit area of a maximum of 75%, advantageously of a maximum of 50%, in particular of a maximum of 33% and particularly preferably of a maximum of 15%, in relation to component A, wherein acid treatment comprises the following stages:

brief immersion of a test piece in 2 wt. % phosphoric acid, storage of test piece for some 24 hours at 20–30% relative atmospheric humidity, optional repetition of these stages until an equivalently treated test piece prepared from component A has undergone a loss of at least 5 mg/cm$^2$.

Alternatively or also simultaneously, the polyoxymethylenes exhibit on acid treatment a loss of mass per unit area of a maximum of 75%, advantageously of a maximum of 50%, in particular of a maximum of 33% and particularly preferably of a maximum of 15%, in relation to component A, wherein acid treatment comprises the following stages:

immersion of a test piece in 10 wt. % phosphoric acid at 80° C., verification of loss of mass of test piece after 24 hours, wherein the test piece is removed from the 10 wt. % phosphoric acid and dried with a warm air blower, optionally repeating these stages until an equivalently treated test piece prepared from component A has undergone a loss of at least 5 mg/cm$^2$.

A particularly high degree of acid resistance is achieved with polyoxymethylenes of the above-stated type which, in addition to components B and/or C, advantageously contain, related to 100 parts of component A, up to 100 parts, advantageously up to 50 parts, in particular up to 25 parts, and particularly preferably up to 10 parts, of a thermoplastic polyurethane. Provided that neither B nor C are added, the POM may contain in addition to component D the stated proportion of a thermoplastic polyurethane other than that defined in D. The POM may moreover contain up to 5 parts of a polyalkene glycol other than that defined in C, wherein the sum of all polyalkene glycols is preferably a maximum of 5 parts related to 100 parts of A, and up to 15 parts of melamine cyanurate.

The polyoxymethylenes according to the invention customarily also contain additives such as, for example, antioxidants, carbon black, colorants, UV absorbers, heat stabilizers, flame retardants etc. These additives may be incorporated into the blends or also into individual components thereof. Particularly for external applications, UV stabilizers and/or carbon black are convenient to prevent premature aging.

Suitable polyoxymethylenes for component A are homopolymers or copolymers, for example produced from formaldehyde or trioxane. They may have a linear structure, but may also be branched or crosslinked. They may be used individually or as blends. Homopolymers are, for example, polymers of formaldehyde or of trioxane, the semi-acetal hydroxyl terminal groups of which are chemically stabilized against degradation, for example by esterification or etherification. Copolymers are, in particular, obtained by copolymerization of trioxane with at least one compound copolymerizable with trioxane. Cyclic ethers are, for example, suitable for this purpose, in particular those with 3-5, preferably 3 ring members, cyclic acetals other than trioxane, in particular formals, for example with 5-11, preferably 5-8 ring members and linear polyacetals, in particular polyformals. The stated comonomers are preferably used in quantities of 0.01-20, in particular 0.1-10 and particularly advantageously 1-5 wt. %. Suitable cyclic ethers are especially epoxides, for example ethylene oxide, styrene oxide, propylene oxide or epichlorohydrin together with glycidyl ethers of mono- or polyhydric alcohols or phenols. Suitable cyclic acetals are especially cyclic formals of aliphatic or cycloaliphatic a, ω-diols with 2-8, preferably 2-4 carbon atoms, the carbon chain of which may be interrupted at 2 carbon atom intervals by an oxygen atom, for example 1,2- or 1,3-dioxolane, 1,3-dioxane, 1,3-dioxepane etc..

Diformals, for example diglycerol diformal, are however also suitable, particularly for the production of trioxane terpolymers.

Suitable linear polyacetals are both homo- or copolymers of the above defined cyclic acetals and linear condensates of aliphatic or cycloaliphatic α,ω-diols with aliphatic aldehydes or thioaldehydes, preferably formaldehyde. In particular, homopolymers of cyclic formals of aliphatic α,ω-diols with 2-8 carbon atoms, for example poly-(1,3-dioxolane), poly-(1,3-dioxane) and poly-(1,3-dioxepane).

The viscosity number of the polyoxymethylene used according to the invention (measured on a solution of the polymer in dimethylformamide containing 2 wt. % of diphenylamine at 135° C. at a concentration of 0.5 g/100 ml) should generally be at least 30 (ml/g). The crystalline melting points of the polyoxymethylenes are preferably in the range 140°-180° C., in particular 150°-170° C.; densities are customarily between 1.38-1.45 g/cm$^3$ (measured to DIN 53 479).

The preferably binary or ternary trioxane copolymers used according to the invention are produced in a known manner by polymerizing the monomers in the presence of cationically active catalysts at temperatures between 0 and 150° C., preferably above 70° C. (c.f. Published German Patent Application DE-AS 14 20 283). Polymerization may be performed by bulk, suspension or solution methods. In order to eliminate unstable portions, the copolymers may be subjected to controlled, partial thermal or hydrolyric degradation to the primary alcohol terminal groups (c.f. for example Published German Patent Applications DE-AS 14 45 273 and 14 45 294).

Further preparative methods are described, for example, in Published German Patent Applications DE-AS 10 37 705 and 11 37 215.

Furthermore, the molding compounds according to the invention may additionally customarily contain up to 3 wt. %, related to the weight of the polyoxymethylene, of other additives commonly used in polyoxymethylene molding compounds. These may be:

antioxidants, in particular phenolic compounds, for example those with 2-6 hydroxyphenyl residues in the molecule, such as are, for example, described in German patent DE 25 40 207.

UV absorbers and light stabilizers such as, for example, 2-(2'-hydroxyphenyl)-benzotriazoles, 2,4-bis-(2'-hydroxyphenyl)-6-alkyl-s-triazines and 4-hydroxybenzophenones.

heat stabilizers such as, for example, carboxylic acid amides, in particular oxalic, malonic, isophthalic, terephthalic acid diamide and trimesic acid triamide; polyamides, salts of long-chain carboxylic acids such as, for example, Ca-stearate, melamine, s-triazine derivatives or condensation products of melamine and formaldehyde.

The thermoplastic polyurethanes used according to the invention are per se known products, such as are, for example, described in German patent DE 11 93 240 or in Published German Patent Application DE-OS 20 51 028. They are produced in a per se known manner by polyaddition of polyisocyanates, in particular diisocyanates, polyesters and/or polyethers or polyester amides or other suitable hydroxy or amino compounds, such as hydroxylated polybutadiene and optionally chain extenders such as low molecular weight polyols, in particular diols, polyamines, in particular diamines, or water.

In principle, all grades of polyurethane and the combinations thereof, such as for example polyester urethanes, polyetherester urethanes, polyether urethanes, aliphatic TPU and/or polyethercarbonate urethanes are suitable. However, polyester urethanes are preferably used. Such polyester urethanes which are preferred for this purpose are those with a Shore A hardness of 80-96, particularly preferably those with a Shore A hardness of 84-92. The concentration of polyurethane used is 0.1 less than 2.6 parts by weight, preferably less than 2.5 parts and more preferably less than 2 parts, related to 100 parts of polyoxymethylene.

Particularly suitable are those potyoxymethylene blends prepared from at least one polyoxymethylene (A) and at least one thermoplastic polyurethane with a Shore A hardness of 80 to 96, wherein the blend contains 0.1 less than 2.6 parts, preferably less than 2.5 parts and more preferably less than 2 parts of the TPU per 100 parts of polyoxymethylene. Also particularly favorable are compositions which, per 100 parts of polyoxymethylene, contain in addition to or instead of the TPU, 0.01-5 parts, in particular 0.1-0.4 parts of a salt of a polybasic organic acid, in particular of an alkali oxalate, in particular sodium or potassium oxalate. The physical properties of the compositions of the stated type are hardly different from those of pure polyoxymethylene, having in particular its stiffness, but additionally very elevated acid resistance.

Polyalkylene glycols are suitable as component C, polyethylene glycols and polypropylene glycols are preferably used, particularly preferably polyethylene glycols. The molecular weight of the polyalkylene glycols used is ≦5000, preferably 800–2000, particularly preferably 900–1500.

The invention also relates to a process for the production of a polyoxymethylene with improved acid resistance in which A 100 parts of polyoxymethylene are blended with B 0.01–5 parts of a salt of a polybasic carboxylic acid and/or C 0.01–5 parts of a polyalkylene glycol, and/or D 0.01–100 parts of a thermoplastic polyurethane together with E 0–15 parts of melamine cyanurate and F customary additives.

The acid stability of the products produced in this manner may be determined as described above.

The polyoxymethylene compositions according to the invention are preferably processed into molded articles.

The invention also relates to the use of 0.01–5 parts of a salt of a polybasic carboxylic acid (B) and/or 0.01–5 parts of a polyalkylene glycol (C), such as for example a polyethylene glycol, polypropylene glycol and/or polybutylene glycol and/or 0.01–100 parts of a thermoplastic polyurethane (D) and 0–15 parts of melamine cyanurate (E)

per 100 parts of a polyoxymethylene (A) in order to improve acid resistance, wherein the procedures for determining acid resistance described above may be used in this case as well.

The above-stated ranges for the added components also apply to the process and use. For the TPU, it is again those with Shore A hardness and the above-stated smaller quantities which are preferred.

DETAILED DESCRIPTION OF PREFERRED EMBODIMENTS

The invention is illustrated in more detail in the following examples.

Description of materials used

POM 1: Copolymer prepared from trioxane and 1,3-dioxepane with approx. 2.55% comonomer content, stabilized with 0.4% triethylene glycol bis-(3-tert.butyl-5-methyl-4-hydroxyphenyl)-propionate as antioxidant. MFI: 8 to 10 g/10 min (190° C./2.16 kp)

POM 2: Copolymer prepared from trioxane and 1,3-dioxepane with approx. 1.0% comonomer content, stabilized with 0.4% triethylene glycol bis-(3-tert.butyl-5-methyl-4-hydroxyphenyl)-propionate as antioxidant. MFI: 12 to 14 g/10 min (190° C./2.16 kp)

TPU 1: Polyetherester urethane, Shore A hardness 85.

TPU 2: Polyethercarbonate urethane, Shore A hardness 88.

Carbon Furnace black with a BET surface area of approx. black 1: 300 m²/g as 25% concentrate in polyoxymethylene matrix, pellets. pH of carbon black 10±1.5.

Carbon Pigment black with a BET surface area of approx. black 2: 260 m²/g as 12.5% concentrate in polyoxymethylene. DBP adsorption 160 ml/100 g carbon black powder.

Other additives:

Sodium oxalate, fine crystalline, technical grade

Lithium oxalate, technical grade

Potassium oxalate, technical grade

Melamine cyanurate (MCA), technical grade

Polyethylene glycol 1000, synthesis grade

Polyethylene glycol 10000, synthesis grade

Polypropylene glycol 1000, technical grade

Finely divided, crosslinked melamine-formaldehyde condensate (MFK)

Dipotassium-EDTA, analytical reagent grade

EXAMPLES

Comparative example a and examples 1–6

The components POM 2, MFK, TPU 1 and sodium oxalate were mixed together in the weight ratios relative to POM 2 stated in Table 1, melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed.

TABLE 1

| Comparative example/ Example | TPU 1 (%) | Sodium oxalate (%) | MFK (%) | Corrosion rates | |
|---|---|---|---|---|---|
| | | | | Test 1 (9 d) | Test 2 (7 d) |
| | | | | (%) relative to a | |
| a | — | — | 0.15 | 100.0 | 100.0 |
| 1 | 3 | — | 0.15 | 24.9 | 62.6 |
| 3 | 6 | — | 0.15 | 11.2 | 42.2 |
| 4 | — | 0.2 | 0.15 | 60.6 | 70.4 |
| 5 | 3 | 0.2 | 0.15 | 14.4 | 34.6 |
| 6 | 6 | 0.2 | 0.15 | 8.3 | 19.6 |

Comparative example b and examples 7–12

The components POM 1, MFK, TPU 1 and sodium oxalate were mixed together in the weight ratios relative to POM 1 stated in Table 2, melted and homogenized in a model ZDS-K 28 twin screw extruder and the homogenized mixture pelletized. The test pieces were produced as described above.

TABLE 2

| Comparative example/ Example | TPU 1 (%) | Sodium oxalate (%) | MFK (%) | Corrosion rates | |
|---|---|---|---|---|---|
| | | | | Test 1 (10 d) | Test 2 (7 d) |
| | | | | (%) relative to b | |
| b | — | — | 0.15 | 100.0 | 100.0 |
| 7 | 1 | — | 0.15 | 56.7 | † |
| 8 | 4 | — | 0.15 | 10.9 | 26 |
| 9 | 8 | — | 0.15 | 5.5 | 12.2 |
| 10 | 2 | 0.2 | 0.15 | 15.5 | 39.9 |
| 11 | 4 | 0.2 | 0.15 | 6.8 | 14.5 |
| 12 | 8 | 0.2 | 0.15 | 4.4 | 6.3 |

†Not determined

Comparative example c and examples 13–14

The components POM 1, MFK, TPU 1 and TPU 2 were mixed together in the weight ratios relative to POM 1 stated in Table 3, melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed.

TABLE 3

| Example | TPU 1 (%) | TPU 2 (%) | MFK (%) | Corrosion rates | |
|---|---|---|---|---|---|
| | | | | Test 1 (10 d) (%) relative to c | Test 2 (10 d) |
| c | — | — | 0.15 | 100.0 | 100.0 |
| 13 | 6 | — | 0.15 | 7.3 | 4 |
| 14 | — | 6 | 0.15 | 7.3 | 16.8 |

Comparative example d and examples 15–17

The components POM 1, MFK, lithium oxalate, potassium oxalate and tri-sodium citrate were mixed together in the weight ratios relative to POM 1 stated in Table 4, melted and homogenized in a model ZDS-K 28 twin screw extruder and the homogenized mixture pelletized. The test pieces were produced as described above.

TABLE 4

| Example | MFK (%) | Lithium oxalate (%) | Potassium oxalate (%) | Sodium citrate (%) | Corrosion rates (11 d) (%) rel. to d |
|---|---|---|---|---|---|
| d | 0.15 | — | — | — | 100.0 |
| 15 | 0.15 | 0.3 | — | — | 34.6 |
| 16 | 0.15 | — | 0.3 | — | 44.2 |
| 17 | 0.15 | — | — | 0.3 | 39.6 |

Comparative example e and examples 18 and 32

The components POM 1, MFK, carbon black, $K_2$-EDTA and sodium oxalate were mixed together in the weight ratios relative to POM 1 stated in Table 5, melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed.

TABLE 5

| Example | MFK (%) | Carbon black (%) | $K_2$-EDTA (%) | Sodium oxalate (%) | Corrosion rates | |
|---|---|---|---|---|---|---|
| | | | | | Test 1 (11 d) (%) relative to e | Test 2 (7 d) |
| e | 0.15 | 0.2 | — | — | 100.0 | 100.0 |
| 18 | 0.15 | 0.2 | — | 0.16 | 54.2 | 67.2 |
| 32 | 0.15 | 0.2 | 0.16 | — | 62.5 | 64.7 |

Comparative example f and examples 19–25

The components POM 1, MFK, TPU 1, PEG 1000, MCA and sodium oxalate were mixed together in the weight ratios relative to POM 1 stated in Table 6, melted and homogenized in a model ZDS-K 28 twin screw extruder and the homogenized mixture pelletized. The test pieces were produced as described above.

TABLE 6

| Example | MFK (%) | TPU 1 (%) | PEG 1000 (%) | MCA (%) | Sodium oxalate (%) | Corrosion Rates | |
|---|---|---|---|---|---|---|---|
| | | | | | | Test 1 (11 d) (%) relative to f | Test 2 (7 d) |
| f | 0.15 | — | — | — | — | 100.0 | 100.0 |
| 19 | 0.15 | 6 | — | — | — | 7.5 | 2.5 |
| 20 | 0.15 | — | — | — | 1.0 | 25.4 | 76.3 |
| 21 | 0.15 | — | 1.0 | — | — | 31.5 | 70.1 |
| 22† | 0.15 | — | — | 1.0 | — | 30.6 | 67.5 |
| 23 | 0.15 | 6 | — | — | 1.0 | 5.5 | 3.8 |
| 24 | 0.15 | 6 | 1.0 | — | — | 3.2 | 0 |
| 25 | 0.15 | 6 | — | 1.0 | — | 6.1 | 16.2 |

†Comparison

Comparative example g and examples 26–31

The components POM 1, MFK, PEG 1000, PEG 10000 and PPG 1000 were mixed together in the weight ratios relative to POM 1 stated in Table 7, melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed.

TABLE 7

| Example | MFK | PEG 1000 (%) | PEG 10000 (%) | PPG 1000 (%) | Corrosion rates | |
|---|---|---|---|---|---|---|
| | | | | | Test 1 (10 d) (%) relative to g | Test 2 (7 d) |
| g | 0.15 | — | — | — | 100.0 | 100.0 |
| 26 | 0.15 | 0.5 | — | — | 28.5 | — |
| 27 | 0.15 | 1.0 | — | — | 17.4 | — |
| 28 | 0.15 | — | 0.5 | — | 34.3 | 70.4 |
| 29 | 0.15 | — | 1.0 | — | 15.8 | 59.7 |
| 30 | 0.15 | — | — | 0.5 | 35 | 73.4 |
| 31 | 0.15 | — | — | 1.0 | 22 | 50.5 |

Comparative example h and Examples 33–36

The components TPU, POM 1 and MFK were mixed together in the weight ratios, relative to POM 1, stated in Table 8, melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed.

TABLE 8

| Comp. Example/ Example | TPU (%) | MFK (%) | Corrosion Rates | |
|---|---|---|---|---|
| | | | Test 1 (10 d) % relative to h | Test 2 (7 d) |
| h | — | 0.15 | 100 | 100 |
| 33 | 0.5 | 0.15 | 60.3 | + |
| 34 | 1.5 | 0.15 | 47.5 | + |

TABLE 8-continued

|  |  |  | Corrosion Rates | |
|---|---|---|---|---|
| Comp. Example/ Example | TPU (%) | MFK (%) | Test 1 (10 d) % relative to h | Test 2 (7 d) |
| 35 | 2.0 | 0.15 | 41.2 | + |
| 36 | 2.5 | 0.15 | 33.0 | + |

As can be seen from the data in Table 8, even amounts as small as 0.5 weight % of TPU effect reasonable acid stabilization of POM.

What is claimed is:

1. A method for stabilizing acidity of a polyoxymethylene composition, which composition contains at least one polyoxymethylene and one or both of components A and B, wherein A is about 0.01–5 parts, related to about 100 parts of the polyoxymethylene, of at least one alkali metal salt of a polybasic acid selected from the group consisting of oxalic acid, maleic acid, fumaric acid, and mixtures thereof, sodium salt of citric acid, potassium salt of citric acid, or mixtures thereof, and B is about 0.01–5 parts, related to about 100 parts of the polyoxymethylene, of a polyethylene glycol having a number average molecular weight of ≦5000 and/or a polypropylene glycol having a number average molecular weight of ≦5000 and/or a polybutylene glycol having a number average molecular weight of ≦5000, which method comprises the step of adding from about 0.1 to less than about 2.6 parts, related to about 100 parts of the polyoxymethylene, of a thermoplastic polyurethane with a Shore A hardness of 70 to 96.

2. The method of claim 1, wherein the amount of said thermoplastic polyurethane is less than about 2.5 parts, related to about 100 parts of the polyoxymethylene.

3. The method of claim 1, wherein the amount of said thermoplastic polyurethane is less than about 2 parts, related to about 100 parts of the polyoxymethylene.

4. The method of claim 1, wherein, after acid treatment, there is a maximum loss of about 75% of mass per unit area, compared to an average loss occurring in said polyoxymethylene alone after treatment, wherein the acid treatment comprises the following stages:

immersion of a test piece in about 2 wt. % phosphoric acid, storage of said test piece for 24 hours at 20–30% relative atmospheric humidity, and repetition of these stages, if necessary, until an equivalently treated test, prepared from polyoxymethylene alone, has undergone said average loss of at least about 5 mg/cm$^2$.

5. The method of claim 1, wherein, after acid treatment, there is a maximum loss of about 75% of mass per unit area, in relation to the average loss occurring in the polyoxymethylene alone after acid treatment, wherein the acid treatment comprises the following stages:

immersion of a test piece in about 10 wt. % phosphoric acid at 80° C., measurement of loss of mass of said test piece after 24 hours, wherein said test piece is removed from the about 10 wt. % phosphoric acid and dried with a warm air blower, and repeating these stages, if necessary, until an equivalently treated test piece prepared from polyoxymethylene has undergone a loss of at least about 5 mg./cm$^2$.

6. The method of claim 1, wherein said polyoxymethylene composition contains at least one member selected from the group consisting of (i) up to about 5 parts of a polyalkylene glycol other than a polyalkylene glycol of part B, and (ii) up to about 15 parts of melamine cyanurate.

7. The method of claim 1, wherein the polyoxymethylene composition further contains an additive selected from the group consisting of antioxidants, colorants, UV absorbers, heat stabilizers, and flame retardants.

8. The method of claim 7, wherein the colorant is carbon black.

* * * * *